US011678683B2

(12) United States Patent
Stark et al.

(10) Patent No.: US 11,678,683 B2
(45) Date of Patent: *Jun. 20, 2023

(54) PROCESSED EDIBLE PRODUCT COMPRISING A POLYELECTROLYTE COMPLEX AND AN ANTIMICROBIAL COMPOUND

(71) Applicant: Ceradis B.V., Wageningen (NL)

(72) Inventors: Jacobus Stark, Wageningen (NL); Wilhelmus Maria van der Krieken, Wageningen (NL); Christiaan Gerardus Johannes Maria Jans, Wageningen (NL)

(73) Assignee: Ceradis B.V., Wageningen (NL)

( * ) Notice: Subject to any disclaimer, the term of this patent is extended or adjusted under 35 U.S.C. 154(b) by 751 days.

This patent is subject to a terminal disclaimer.

(21) Appl. No.: 16/654,384

(22) Filed: Oct. 16, 2019

(65) Prior Publication Data

US 2020/0113212 A1    Apr. 16, 2020

Related U.S. Application Data

(62) Division of application No. 14/916,426, filed as application No. PCT/NL2014/050608 on Sep. 4, 2014, now abandoned.

(30) Foreign Application Priority Data

Sep. 4, 2013  (EP) ..................................... 13183018

(51) Int. Cl.
| | | |
|---|---|---|
| A23L 3/3571 | (2006.01) | |
| A23L 3/3463 | (2006.01) | |
| A23B 4/22 | (2006.01) | |
| A23C 19/11 | (2006.01) | |
| A21D 15/08 | (2006.01) | |
| A23C 19/10 | (2006.01) | |

(52) U.S. Cl.
CPC ............ *A23L 3/3571* (2013.01); *A21D 15/08* (2013.01); *A23B 4/22* (2013.01); *A23C 19/10* (2013.01); *A23C 19/11* (2013.01); *A23L 3/34635* (2013.01)

(58) Field of Classification Search
CPC ... A23L 3/3571; A23L 3/34635; A21D 15/08; A23C 19/10; A23C 19/11; A23B 4/22
See application file for complete search history.

(56) References Cited

U.S. PATENT DOCUMENTS

| | | | |
|---|---|---|---|
| 4,148,891 A | 4/1979 | Smink | |
| 4,245,432 A | 1/1981 | Dannelly | |
| 5,578,598 A | 11/1996 | Abe et al. | |
| 8,337,923 B2 | 12/2012 | Coyne et al. | |
| 9,635,855 B2 | 5/2017 | van der Krieken et al. | |
| 10,342,228 B2 * | 7/2019 | van der Krieken .... | A01N 43/90 |
| 2007/0065547 A1 | 3/2007 | Coyne et al. | |
| 2007/0104836 A1 | 5/2007 | Zhao et al. | |
| 2008/0254078 A1 | 10/2008 | Kauper et al. | |
| 2009/0117195 A1 | 5/2009 | Kauper et al. | |
| 2011/0038921 A1* | 2/2011 | Wen .................... | A61K 38/1808 514/460 |
| 2015/0038442 A1 | 2/2015 | van der Krieken et al. | |
| 2015/0105478 A1 | 4/2015 | van der Krieken et al. | |
| 2016/0192643 A1 | 7/2016 | Stark et al. | |
| 2017/0303532 A1 | 10/2017 | van der Krieken et al. | |

FOREIGN PATENT DOCUMENTS

| | | |
|---|---|---|
| CN | 101911944 A | 12/2010 |
| CN | 102120514 A | 7/2011 |
| EP | 0865738 A1 | 9/1998 |
| FR | 2252056 A1 | 6/1975 |
| JP | H09-041271 | 2/1997 |
| WO | 1995008918 A1 | 4/1995 |
| WO | 20040105491 A1 | 12/2004 |
| WO | 2008009657 A2 | 1/2008 |
| WO | 2009077613 A1 | 6/2009 |
| WO | 2010035118 A1 | 4/2010 |
| WO | 2011086196 A1 | 7/2011 |
| WO | 2011123290 A1 | 10/2011 |
| WO | 2011123297 A1 | 10/2011 |
| WO | 2012036550 A1 | 3/2012 |

(Continued)

OTHER PUBLICATIONS

International Search Report from corresponding PCT Application No. PCT/NL2014/050608 dated Nov. 28, 2014.
Tripathi et al., "Preparation and Physicochemical Evaluation of Chitosan/Poly (Vinyl Alcohol)/Pectinternary Film for Food-Packaging Applications," Carbohydrate Polymers, 79:711-716 (2010).
International Search Report from International Application No. PCT/NL2013/050143, dated May 14, 2013.
International Search Report from International Application No. PCT/NL2013/050144, dated May 8, 2013.
International Search Report from PCT Application No. PCT/NL2014/050607 dated Mar. 26, 2015.

(Continued)

*Primary Examiner* — Nikki H. Dees
(74) *Attorney, Agent, or Firm* — Dentons US LLP

(57) ABSTRACT

The invention related to a processed edible product comprising a complex of at least one antimicrobial compound and a polyelectrolyte complex of a polyanion and a polycation. The invention further relates to a method for producing a processed edible product comprising a complex of at least one antimicrobial compound and a polyelectrolyte complex of a polyanion and a polycation, to a method for preventing spoilage of a processed edible product, and to a method of preventing, reducing and/or eliminating the presence of fungi, bacteria and/or viruses on a processed edible product. The invention additionally relates to a use of a complex of a antimicrobial compound and a polyelectrolyte complex of a polyanion and a polycation for preventing, reducing and/or eliminating the presence of fungi, bacteria and/or viruses on a processed edible product.

8 Claims, No Drawings

(56) References Cited

FOREIGN PATENT DOCUMENTS

| WO | 2012101256 A1 | 8/2012 |
|---|---|---|
| WO | 2013133705 A1 | 9/2013 |
| WO | 2013133706 A1 | 9/2013 |
| WO | 2015034359 A2 | 3/2015 |

OTHER PUBLICATIONS

Fredheim et al., "Polyelectrolyte Complexes: Interactions Between Lignosulfonate and Chitosan," Biomacromolecules, 4:232-239 (2003.
Wang et al., "Preparation of Lignosulfonate-Chitosan Polyelectrolyte Complex," Advanced Materials Research, vol. 197-198:1249-1252 (2011).
Thobunluepop, "The Inhibitory Effect of the Various Seed Coating Substances Against Rice Seed Borne Fungi and Their Shelf-Life During Storage," Pakistan Journal of Biological Sciences, 12:1102-1110 (2009).
Thobunluepop et al., "The Perspective Effects of Various Seed Coating Substances on Rice Seed Variety Khao Dawk Mali 105 Storability I," Pakistan Journal of Biological Sciences, 11:2291-2299 (2008).
Thobunluepop et al., "The Perspective Effects of Various Seed Coating Substances on Rice Seed Variety Khao Dawk Mali 105 Storability II," Pakistan Journal of Biological Sciences, 12:574-581 (2009).
Thobunluepop et al., "Physiological and Biochemical Evaluation of Rice Seed Storability with Different Seed Coating Techniques," International Journal of Agricultural Research, 4:169-184 (2009).
Merriam-Webster's Collegiate Dictionary, published 1998 by Merriam-Webster, Incorporated, p. 924.
Wang et al. "Antifungal activity of eugenol against Botrytis cinerea" Tropical Plant Pathology, 35(3):137-143 (2010).
Kim, S., et al., Chitosan-lignosulfonates sono-chemically prepared nanoparticles: Characterisation and potential applications. Colloids and Surfaces B: Biointerfaces. vol. 103, pp. 1-8. (Year: 2013).

* cited by examiner

PROCESSED EDIBLE PRODUCT COMPRISING A POLYELECTROLYTE COMPLEX AND AN ANTIMICROBIAL COMPOUND

This application is a divisional of U.S. application Ser. No. 14/916,426, filed Mar. 3, 2016 (pending), which application is a 371 National Stage application of International Application No. PCT/NL2014/050608 filed Sep. 4, 2014, which claims the benefit of priority to EP 13183018.4 filed Sep. 4, 2013, the entire disclosures of which are incorporated herein by reference in their entirety.

FIELD

The present invention relates to a processed edible product comprising a complex of at least one antimicrobial compound and a polyelectrolyte complex of a polyanion (such as lignosulfonate) and a polycation (such as chitosan). The invention further relates to methods for producing a processed edible product of the invention.

INTRODUCTION

It has been estimated that about 25% of the world's food supply is lost as a result of microbial spoilage of food and feed. Also from a consumer safety point of view, microorganisms are a risk causing food-poisoning diseases. Preventing the presence and/or growth of unwanted microorganisms in food and feed is an important issue in industry. There is a continuous need for effective and safe antimicrobials which can be applied in food and feed products. The main targets of food and feed preservatives are: (1) spoilage microorganisms which are able to survive and multiply in a product and thus can spoil it; (2) food-poisoning microorganisms or pathogens which form a health risk.

Examples of food-spoilage microorganisms are many species of moulds, yeast and bacteria. Examples of food-poisoning microorganisms are bacteria such as *Salmonella* species, *Listeria monocytogenes*, *Campylobacter* species, *Staphylococcus aureus*, *Clostridium* species, *Bacillus cereus* and *Escherichia coli* species. Other examples of food-poisoning microorganisms are viruses and mycotoxin producing moulds.

Most spoilage is caused by moulds. Therefore combatting moulds is an important issue in food and feed industry. An example of an antifungal compound applied in practice is the polyene antifungal compound natamycin.

For almost 40 years, natamycin has been used to prevent fungal growth on food products such as cheeses, sausages, beverages, bakery goods and fruit products. There are several ways to treat food and feed with natamycin. Natamycin can be applied directly on the product by spraying (e.g. on shredded cheese or bread) or dipping (e.g. cheeses). It can also be mixed through the product (e.g. for beverages and yoghurt). On for example cheeses and sausages, natamycin can also be applied via a wax or a coating; e.g. natamycin can be added to an emulsion of a polymer, mostly polyvinyl acetate, in water which can be applied as a coating on e.g. cheese; a casing or spraycoating can be applied on sausages. Natamycin can be added in one of the processing steps in the coating production process in case of animal feed.

Natamycin is a very effective antifungal. Almost all moulds and yeasts occurring in food industry show high sensitivity towards natamycin and thus can be eliminated by natamycin. Natamycin has a MIC (Minimal Inhibitory Concentration) of less than 10 ppm for most fungi, thus the dissolved fraction of 30-40 ppm should under normal conditions be sufficient to prevent development of moulds and/or yeasts.

In case of treatment by immersion of a suspension of natamycin in water, the suspension contains usually 1000 to 2000 ppm of natamycin; while emulsions for coating purposes usually contain 50 to 500 ppm of natamycin; when applied in liquid products the concentration is usually 2 to 20 ppm of natamycin.

Such treatments can be highly effective in preventing fungal growth on the surface of e.g. cheeses and sausages or in liquid products such as beverages and fruit yoghurt. Natamycin is poorly soluble in water. In neutral aqueous systems its solubility will be around 30-40 ppm. In these conditions most natamycin is present in crystalline form. These crystals are quite stable under various conditions. Since only dissolved natamycin has antifungal activity, the crystals will not contribute to the antifungal activity of natamycin.

Under normal conditions natamycin will sufficiently protect food products on which it is applied already for decades such as cheeses and sausages. However, new production processes and other types of products (e.g. light cheeses or cheeses which less salt) may result in products which are more susceptible to mould growth. Also mould species which are less susceptible to natamycin may sometimes develop. An example of such a mould is *Penicillium* discolor which may cause spoilage problems in modern cheese industry on cheeses treated with natamycin.

The availability of active "dissolved" natamycin is determined by its solubility, diffusion of the dissolved fraction to the site of action and its elimination. Elimination will occur when natamycin binds irreversibly to fungal cell membranes or by external factors such as UV light and chemical interactions. In case of high contamination or contamination with high amounts of less sensitive moulds, natamycin will be used up rapidly.

In addition, the limiting chemical and physiological characteristics of natamycin and thus its limited efficacy prevents the broader use of natamycin on many other applications; its efficacy is simply not good enough or the required dosages are too high and thus economically not feasible. It can be concluded that its low solubility is a limiting factor for a broader use.

The low solubility of natamycin and its limited diffusion from the crystals are real drawbacks in the efficacy and broader use of natamycin. When the amount of fungi to be eliminated is high or when fungi that are more tolerant towards natamycin are present, natamycin is used up faster. Further, under negative conditions such as UV light and chemical interactions the average amount of dissolved natamycin can drop below the effective concentration because elimination will not be adequately compensated anymore. In case natamycin is used up in high amounts or when it is inactivated due to negative environmental conditions, it is unlikely that the level of 30-40 ppm of dissolved natamycin will be maintained all the time. Natamycin only dissolves slowly from the crystals. Together with its limited diffusion, this means that it simply takes time before the whole surface of e.g. a cheese will be protected again with the required concentration of 30-40 ppm dissolved natamycin. Too low levels of dissolved natamycin will result in spoilage of the product by moulds and/or yeasts.

Spoilage by moulds causes considerable economic losses; fungal spoilage can also be a health risk due to the formation of mycotoxins. There is a severe need for a more efficient antimicrobial system to prevent spoilage of food and feed products. Natamycin inhibits almost all moulds which can spoil these products. Unfortunately its efficacy and thus its use are limited due to the drawbacks of its poor solubility and dissolution characteristics. The availability of active dissolved natamycin can be enhanced by using extreme alkaline or acidic conditions or by using solvents. However, natamycin will be rapidly inactivated under such conditions and thus these compositions have to be used immediately after preparation. Alkaline or acidic solutions will have limited efficacy on most food products which of course usually do not have an extremely high or extremely low pH. It is obvious that the use of solvents is usually not permitted for food and feed applications.

It can be concluded that there is no suitable method for food and feed applications to enhance the activity of natamycin.

Unexpectedly it has been found that the activity of natamycin towards fungi can be markedly enhanced if natamycin is complexed according to the method of the invention. Moreover it has been found that the complexes of this invention are very stable under aqueous conditions.

SUMMARY OF THE INVENTION

The invention provides a processed edible product comprising a complex of at least one antimicrobial compound and a polyelectrolyte complex of a polyanion and a polycation. Said polyanion and the polycation are preferably present in a relative amount of between 1:2 and 60:1 (w/w).

A polyelectrolyte complex of a polyanion and a polycation is an irreversible and insoluble complex. This complex alone does not have antimicrobial efficacy. The polyelectrolyte complex has sticky properties and contains polar parts (charges) and apolar parts. The aromatic moieties in the complex may have affinity for antimicrobial compounds such as natamycin. In combination with the sticky character of the polyelectrolyte complex, the antimicrobial will be optimally deposited and adhered to the processed edible product.

Said polyanion is preferably selected from the group consisting of a natural polyanion such as xanthan gum, alginate, a lignin compound such as lignosulfonate, pectin, carrageenan, humate, fulvate, angico gum, gum Kondagogu, sodium alkyl naphtalene sulfonate (Morwet), poly-γ-glutamic acid, maleic starch half-ester, carboxymethyl cellulose, chondroitin sulphate, dextran sulphate, hyaluronic acid and a synthetic polyanion such as poly(acrylic acid), polyphosphoric acid, and poly(L-lactide). Said polyanion most preferably is a lignin compound such as lignosulfonate.

Said polycation is preferably selected from the group consisting of poly-L-lysine, epsilon-poly-L-lysine, poly-L-arginine, poly-allylamine, chitosan oligosaccharide, and chitosan. Said polycation most preferably is chitosan.

Said at least one antimicrobial compound preferably is or comprises a polyene fungicide, most preferably said at least one antimicrobial compound is natamycin.

The processed edible product preferably is a dairy product, a meat product, a bakery product, a fruit-derived product, an egg-derived product, a beverage, an animal feed, or a vegetable-derived product.

It was surprisingly found that said complexes, comprising of at least one antimicrobial compound and a polyelectrolyte complex, dramatically improved the antimicrobial effect of antimicrobial compounds such as natamycin against fungi, in comparison with an antimicrobial compound without said polyelectrolyte complex. Without being bound by theory, said polyelectrolyte complex may provide improved, longer lasting, adherence of the antimicrobial compound to the processed edible product and/or the adherence to the microbe.

The invention further provides a method for producing a processed edible product comprising a complex of at least one antimicrobial compound and a polyelectrolyte complex of a polyanion and a polycation, the method comprising a) providing an aqueous solution of a polyanion, wherein the concentration of said polyanion is from 0.1-60 w/v %, b) providing a polycation, c) adding the polycation to the polyanion solution, thereby forming a precipitate, d) crushing the formed precipitate to form a suspension, and e) adding the suspension to a processed edible product; whereby at least one antimicrobial compound is added to the product of one of steps (a-d) prior to the addition of the suspension to a processed edible product.

The invention further provides a method for preventing spoilage of a processed edible product, comprising a) providing an aqueous solution of a polyanion, wherein the concentration of said polyanion is from 0.1-60 w/v %, b) providing a polycation, c) adding the polycation to the polyanion solution, thereby forming a precipitate, d) crushing the formed precipitate to form an emulsion, and e) adding the suspension to a processed edible product; whereby at least one antimicrobial compound is added to the product of one of steps (a-d) prior to the addition of the suspension to a processed edible product.

The invention further provides a method of preventing, reducing and/or eliminating the presence of fungi, bacteria and/or viruses on a processed edible product, comprising a) providing an aqueous solution of a polyanion, wherein the concentration of said polyanion is from 0.1-60 w/v %, b) providing a polycation, c) adding the polycation to the polyanion solution, thereby forming a precipitate, d) crushing the formed precipitate to form an suspension, and e) adding the suspension to a processed edible product; whereby at least one antimicrobial compound is added to the product of one of steps (a-d) prior to the addition of the suspension to a processed edible product.

It is preferred that the at least one antimicrobial compound in a method of the invention is or comprises a polyene fungicide, preferably natamycin.

The invention further provides the use of a complex of an antimicrobial compound and a polyelectrolyte complex of a polyanion and a polycation for preventing, reducing and/or eliminating fungi, bacteria and/or viruses on a processed edible product.

Preferred processed edible products are processed food- and feed-products including, but are not limited to, dairy products such as hard/semi-hard and soft cheese, shredded cheese, cottage cheese, sour cream, cream cheese, ice cream and dairy desserts such as yoghurt and fruit yoghurt; meat products such as dry fermented sausages, salami, smoked ham and smoked fish; bakery products such as bread, cake, pre-baked bread, toppings and bakery fillings; fruit-derived products such as fruit pulp, marmalade, fruit salads and juices; liquid egg products such as egg yolk, cooled liquid eggs, concentrated frozen and deep frozen eggs; alcoholic and non-alcoholic beverages such as ice-tea, lemonade, bear and wine; animal feed such as broiler feed and pet food; and vegetable-derived products such as ketchup, paste, olive and soya oil, soup, for example tomato soup, and processed starch products such as pasta.

DETAILED DESCRIPTION

The present invention provides a processed edible product comprising a complex of at least one antimicrobial compound and a polyelectrolyte complex of a polyanion and a polycation.

The term "polyelectrolyte" refers to a molecule consisting of a plurality of charged groups that are linked to a common backbone. In the context of this application, the term "polycation" is interchangeable with the term "positively charged polyelectrolyte" and the term "polyanion" is interchangeable with the term "negatively charged polyelectrolyte".

The term "polyelectrolyte complex" refers to a complex of oppositely charged polyelectrolytes (a polyanion and a polycation) which form strong electrostatic links, thus avoiding the use of covalent cross-linkers. The complex is not soluble.

According to the invention, a polyelectrolyte complex that is formed between a polyanion, preferably xanthan gum, humate, alginate or lignosulfonate, most preferably lignosulfonate, and a polycation, preferably chitosan, in a relative amount of between 1:2 and 60:1 (w/w) improves the activity of the antimicrobial compound such as natamycin, resulting in a reduction of the amount of e.g. natamycin that is required to protect a processed edible product from spoilage.

The polyelectrolyte complex comprises a polyanion, such as a lignin-compound, xanthan gum, humate and alginate, and a polycation, such as chitosan or poly-allylamine, in a relative amount of between 1:2 and 60:1 (w/w), more preferred between 1:1 and 50:1, more preferred between 2:1 and 30:1, such as about 2:1, about 5:1, about 10:1; about 15:1, about 20:1, about 25:1 and about 30:1 (w/w). The relative amount of a polyanion, preferably a lignin compound, and a polycation, preferably a chitosan, in a polyelectrolyte complex is most preferred about 5:1 (w/w).

A preferred complex comprises an antimicrobial compound, preferably a polyene fungicide, preferably natamycin, optionally at least one additional antimicrobial compound, and a polyelectrolyte complex between a polycation, preferably chitosan, and a polyanion, preferably lignosulfonate. In a watery solution at a pH of about 4.5, polycations such as chitosan polymers are positively charged and the cationic amino groups on the glucosamine subunits can interact electrostatically with anionic groups (usually sulfonic acid groups) of polyanions such as lignosulfonate to form polyelectrolyte complexes.

Without being bound by theory, it is thought that the addition of an antimicrobial compound to a polyelectrolyte complex results in the reversible binding of the antimicrobial compound to the polyelectrolyte complex, resulting in an improved, longer lasting, adherence of the natamycin to the processed edible product and/or the microbe. In addition, it is thought that the polyelectrolyte complex provides a slow, continuous release of the antimicrobial compound over time, thereby providing a longer lasting antimicrobial activity of the antimicrobial compound.

Said polyanion is preferably selected from the group consisting of a natural polyanion such as xanthan gum, alginate, a lignin compound such as lignosulfonate, pectin, carrageenan, humate, fulvate, angico gum, gum Kondagogu, sodium alkyl naphtalene sulfonate (Morwet), poly-γ-glutamic acid, maleic starch half-ester, carboxymethyl cellulose, chondroitin sulphate, dextran sulphate, hyaluronic acid and a synthetic polyanion such as poly(acrylic acid), polyphosphoric acid, and poly(L-lactide). Preferably, said polyanion is selected from the group consisting of xanthan gum, alginate, humate and lignosulfonate. A most preferred polyanion is or comprises a lignin compound such as lignosulfonate. Said polyanion may comprise two or more distinct polyanions such as, for example, xanthan gum and a lignin compound such as lignosulfonate or pectin and a lignin compound such as lignosulfonate.

The term "lignin compound" refers to a compound that is derived from naturally occurring lignin or lignen by a process that includes sulphonation. The resulting sulfonic acids are strong acids and lignin compounds are therefore negatively charged at pH values below 7.

A preferred lignin compound is selected from Kraft lignin, organosolv lignin and/or lignosulfonate.

A Kraft lignin is a polyphenolic product from the Kraft pulping process for the conversion of wood into wood pulp. Included are derivatives from Kraft lignin obtained by oxidation or other chemical modification as is known to the skilled person.

An organosolv lignin is a polyphenolic product from delignification processes using organic solvents. Included are derivatives from organosolv lignin obtained by oxidation or other chemical modification as is known to the skilled person.

Lignosulfonate (also termed lignosulphonate, lignosulfate, lignin sulfonate, ligninsulfonate, ligninsulfonic acid, lignosulfonic acid, lignosulfuric acid, or LST 7) is a water-soluble anionic polymer which is, for example, formed as a by-product in the sulphite pulping process. Lignosulfonates generally have a wide molecular weight distribution, typically in the range of about 500 to about 150,000. Lignosulfonates may comprise different metal or ammonium ions as counter cations of the sulfonate groups such as, for example, copper, zinc, calcium, sodium, potassium, magnesium and aluminium. Suitable examples of lignosulfonates comprise sodium lignosulfonate (e.g. sold as BORRESPERSE NA®, Borregaard LignoTech Ltd, Germany), calcium lignosulfonate (e.g. sold as BORRESPERSE CA®, Borregaard LignoTech Ltd, Germany), ammonium lignosulfonate, potassium lignosulfonate, modified lignosulfonate, derivatives of lignosulfonate, or mixtures thereof. Modified lignosulfonates, and derivatives of lignosulfonates are described in U.S. Pat. Nos. 3,639,263, 3,923,532, 4,006,779, 4,017,475, 4,019,995, 4,069,217, 4,088,640, 4,133,385, 4,181,652, 4,186,242, 4,196,777, 4,219,471, 4,236,579, 4,249,606, 4,250,088, 4,267,886, 4,269,270, 4,293,342 4,336,189, 4,344,487, 4,594,168, 4,666,522, 4,786,438, 5,032,164, 5,075,402, 5,286,412, 5,401,718, 5,446,133, 5,981,433, 6,420,602, and 7,238,645, which are incorporated herein by reference.

A preferred lignin compound is lignosulfonate. A preferred lignosulfonate is copper, zinc, calcium, sodium, potassium, ammonium, magnesium and/or aluminium lignosulfonate, preferably calcium, sodium, potassium or ammonium lignosulfonate, most preferred calcium lignosulfonate.

Said polycation is preferably selected from the group consisting of poly-L-lysine, epsilon-poly-L-lysine, poly-L-arginine, chitosan oligosaccharide, poly-allylamine and chitosan. Most preferably, said polycation comprises or is chitosan.

As used herein, the term "chitosan" refers to a linear polysaccharide composed of randomly distributed β-(1-4)-linked D-glucosamine (deacetylated unit) and N-acetyl-D-glucosamine (acetylated unit). Chitosan is produced by deacetylation of chitin. The term "chitosan" relates to chitosan, chitosan derivatives and mixtures of chitosan and chitosan derivatives.

The term chitosan relates to linear p-(1→4)-linked glucosamin and N-acetylglucosamin. It may be produced from chitin or its sodium salt (e.g. originating from shrimp) by treatment with aqueous sodium hydroxide at elevated temperatures, or by enzymatic treatment with, for example, a chitin deacetylase (EC 3.5.1.41). Further sources of chitin are fungi, including Basidiomycetes, Ascomycetes, and Phycomycetes, where it is a component of cell walls and structural membranes of mycelia, stalks, and spores. A most preferred chitosan is from fungi or derived from fungi.

Typically, deacetylation as determined by colloidal titration is from 50 to 99.9%, preferably from 70 to 99.8% and most preferably from 90 to 99.7%, as compared to chitin. Chitosan derivatives can be prepared by reactions at the amino group (e.g. by N-acylation, formation of N-alkylidene and N-arylidene derivatives, N-alkylation and N-arylation) or at hydroxy groups, as is known to the skilled person.

It was found that a polyanion, for example a lignin compound such as lignosulfonate, forms a stable polyelectrolyte complex with a polycation such as chitosan. A polyelectrolyte complex may comprise a mixture of two or more lignin compounds and/or a mixture of two or more chitosan polymers.

The term "antimicrobial compound", as is used herein, refers to a natural or chemical substance capable of inhibiting the growth of microorganisms, inhibiting the germination of spores of microorganisms and/or eliminating the microorganisms or their spores. Said antimicrobial compound can be any compound active against moulds, yeasts, bacteria and/or viruses which is applied in food products, feed products, cosmetic products, pharmaceutical products and forestry products. Such an antimicrobial compound can be an antifungal, antibacterial or antivirus compound or a compound having a broader spectrum of activity against fungi and/or bacteria and/or viruses. Said antimicrobial compound is preferably an antifungal, antibacterial or antivirus compound, or a compound having a broad spectrum of activity against fungi and/or bacteria and/or viruses.

The at least one antimicrobial compound is or comprises an antimicrobial compound that is commonly applied in food and feed industry to inhibit or eliminate pathogenic microorganisms and/or moulds, yeasts- and food spoilage bacteria. An example of such at least one antimicrobial compound is provided by a weak acid preservative such as sorbic acid or an alkali or alkali earth metal salt thereof; sodium chloride; a bacteriocin such as nisin; an enzyme such as lysozyme; an extract from one or more plants, a herbs and/or a spice such as carvacrol and cinnamic acid; a disinfectant such as chlorine and hydrogen peroxide, and a polyene fungicide, preferably natamycin.

A preferred antimicrobial compound is an antimicrobial compound that is usually applied as a food preservative in food and feed industry to inhibit or eliminate pathogenic microorganisms and/or moulds, yeasts- and food spoilage bacteria. Preferred food preservatives are weak acid preservatives such as sorbic acid, propionic acid, benzoic acid, hydroxybenzoic acids, lactic acid, citric acid, acetic acid, or an alkali or alkali earth metal salt thereof; sodium chloride; inorganic acids such as hydrochloric acid and phosphoric acid; sulphor dioxide and sulfites; nitrate and nitrite; bacteriocins such as nisin or pediocin; polyene fungicides; enzymes or enzyme systems such as lysozyme, cell wall degrading enzymes such as chitinases and glucanases, lactoperoxidase and glucose oxidase; epsilon-poly-L-lysine; extracts from plants, herbs and spices such as carvacrol, cinnamic acid, cinnamic aldehyde, limonene, especially D-limonene, orange oil, eugenol and thymol; disinfectants such as chlorine, chlorine dioxide, hydrogen peroxide and trisodiumphosphate.

The term "polyene fungicide", as used herein, refers to polyene macrolide antifungals that possess antifungal activity such as natamycin, lucensomycin, filipin, nystatin or amphotericin B, most preferred natamycin. Derivatives of a polyene fungicide, such as derivatives of natamycin, are also included. A preferred derivative is a salt or a solvate of a polyene fungicide and/or a modified form of a polyene fungicide such as e.g. different shaped crystal forms such as the needle-shaped crystal of natamycin described in U.S. Pat. No. 7,727,966.

The effective amount of an antimicrobial compound together with the polyelectrolyte complex depends on the type of antimicrobial compound and the product to which the antimicrobial compound is added. Thus, the required concentration may differ depending on the efficacy of the individual antimicrobial compound in or on a certain product and the required level of protection for that product, as is well known to the person skilled in the art.

For example, in the case of natamycin: cheese coatings usually contain 100 to 1000 ppm of natamycin, dipping suspensions applied on dry sausages or cheese usually contain 1000 to 3000 ppm of natamycin; a concentration of 2 to 10 ppm of natamycin is usually sufficient to prevent spoilage by yeast or moulds in beverages.

Two antimicrobial compounds that are widely applied in the food industry are sorbic acids and benzoic acids or their salts sorbates or benzoates. In beverages, these antimicrobials may be used at concentrations from 100 to 1000 ppm, more preferably from 200 to 500 ppm. In most other food products, however, these antimicrobials may be used to concentrations up to 5000 ppm or even higher.

Another example of an antibacterial compound is nisin. This antimicrobial peptide inhibits bacteria such as spore-forming bacteria belonging to the genera of *Bacillus* and *Clostridium, Listeria monocytogenes* and lactic acid bacteria. Nisin is applied in e.g. cheese against *Clostridium* species and in meat products against spoilage bacteria in concentrations from 10 up to 500 ppm.

The at least one antimicrobial compound preferably comprises a polyene fungicide, preferably natamycin, and/or an antibacterial compound preferably nisin and/or lysozyme.

The at least one antimicrobial compound preferably comprises at least two antimicrobial compounds. Said at least two antimicrobial compounds preferably comprise a polyene fungicide, preferably natamycin, and/or an antibacterial compound preferably nisin and/or lysozyme, combined with one or more of a weak acid preservative preferably sorbic acid, propionic acid, benzoic acid, hydroxybenzoic acids, lactic acid, citric acid, acetic acid or an alkali or alkali earth metal salt thereof, sulphor dioxide, sulfite, nitrate and/or nitrite.

A processed edible product according to the invention is preferably selected from processed food and feed products. Said processed edible product is preferably a dairy product, a meat product, a bakery product, a fruit-derived product, an egg-derived product, a beverage, an animal feed, or a vegetable-derived product.

A preferred processed food or feed product includes, but is not limited to, a dairy product such as hard/semi-hard and soft cheese, shredded cheese, cottage cheese, sour cream, cream cheese, ice cream and a dairy dessert such as yoghurt and fruit yoghurt; a meat product such as a sausage, for example a dry fermented sausage, salami, smoked ham and smoked fish; a bakery product such as bread, cake, pre-baked bread and bakery fillings; a fruit-derived product such as fruit pulp, marmalade and juice; egg products such as egg yolk, cooled liquid eggs, concentrated frozen and deep frozen eggs; an alcoholic or non-alcoholic beverage such as lemonade and wine; an animal feed such as broiler feed and pet food; and a vegetable-derived product such as ketchup, a paste such as tomato paste, olive and soya oil, soup, for example tomato soup, and a processed starch product such as a pasta.

A preferred processed food or feed product is or comprises cheese, a sausage, a beverage, an egg product and/or an animal feed. A most preferred product is or comprises cheese or a sausage.

The invention further provides a method for producing a processed edible product comprising a complex according to the invention, the method comprising (a) providing an aqueous solution of a polyanion wherein the concentration of said polyanion is from 0.1-60 w/v %, preferably 1-50%, preferably about 25%, (b) providing a polycation, (c) mixing the polycation with the polyanion solution, thereby forming a precipitate, (d) crushing the formed precipitate to form an suspension, and (e) adding the suspension to a processed edible product; whereby at least one antimicrobial compound is added to the product of one of steps (a-d) prior to the addition of the suspension to a processed edible product.

Said method preferably comprises (a) providing an aqueous solution of a polyanion wherein the concentration of said polyanion is from 0.1-60 w/v %, preferably 1-50%, preferably about 25%, (b) providing an aqueous acidic solution of a polycation wherein the concentration of said polycation is from 0.1-30 w/v %, preferably 1-10%, preferably about 5%, and the pH is below pH=5.5, (c) adding the solution of a polyanion to the solution of a polycation or vice versa, thereby forming a precipitate, (d) crushing the formed precipitate to form an suspension, and (e) adding the suspension to a processed edible product; whereby at least one antimicrobial compound is added to the product of one of steps (a-d) prior to the addition of the suspension to a processed edible product.

A complex according to the invention may be used for treating any product susceptible for microbial infection. It is preferably used for the protection of processed food and feed products against spoilage by moulds, yeasts and/or bacteria.

The invention further provides a method for preventing spoilage of a processed edible product, comprising a) providing an aqueous solution of a polyanion, wherein the concentration of said polyanion is from 0.1-60 w/v %, preferably 1-25%, preferably about 10%, b) providing a polycation, c) mixing the polycation with the polyanion solution, thereby forming a precipitate, d) crushing the formed precipitate to form an emulsion, and e) adding the suspension to a processed edible product; whereby at least one antimicrobial compound is added to the product of one of steps (a-d) prior to the addition of the suspension to a processed edible product Said method preferably comprises a) providing an aqueous solution of a polyanion, wherein the concentration of said polyanion is from 0.1-60 w/v %, preferably 1-25%, preferably about 10%, b) providing an aqueous acidic solution of a polycation, wherein the concentration of said polycation is from 0.1-30 w/v %, preferably 1-10%, preferably about 5%, and the pH is below pH=5.5, c) adding the polyanion solution to the polycation solution or vice versa, thereby forming a precipitate, d) crushing the formed precipitate to form an emulsion, and e) adding the suspension to a processed edible product; whereby at least one antimicrobial compound is added to the product of one of steps (a-d) prior to the addition of the suspension to a processed edible product.

The invention further provides a method of preventing, reducing and/or eliminating the presence of fungi, bacteria and/or viruses on a processed edible product, comprising a) providing an aqueous solution of a polyanion, wherein the concentration of said polyanion is from 0.1-60 w/v %, preferably 1-25%, preferably about 10%, b) providing a polycation, c) mixing the polycation with the polyanion solution, thereby forming a precipitate, d) crushing the formed precipitate to form an suspension, and e) adding the suspension to a processed edible product; whereby at least one antimicrobial compound is added to the product of one of steps (a-d) prior to the addition of the suspension to a processed edible product.

Said method preferably comprises a) providing an aqueous solution of a polyanion, wherein the concentration of said polyanion is from 0.1-60 w/v %, preferably 1-25%, preferably about 10%, b) providing an aqueous acidic solution of a polycation, wherein the concentration of said polycation is from 0.1-30 w/v %, preferably 1-10%, preferably about 5%, and the pH is below pH=5.5, c) adding the polyanion solution to the polycation solution or vice versa, thereby forming a precipitate, d) crushing the formed precipitate to form an suspension, and e) adding the suspension to a processed edible product; whereby at least one antimicrobial compound is added to the product of one of steps (a-d) prior to the addition of the suspension to a processed edible product.

The terms "polyanion", "polycation", "at least one antimicrobial compound", and "processed edible product" are used in a method of the invention as defined herein before.

The suspension comprising the complex of at least one antimicrobial compound and a polyelectrolyte complex can be added directly to a processed edible product according to any method known in the art, such as spraying it on the product, dipping or immersing the product in the suspension, brushing the suspension onto the product, or mixing the suspension through the product. In addition, the suspension can be added to waxes or coating emulsions, for example polyvinyl acetate, which can be applied as a coating on e.g. cheese, as is commonly applied in food and feed industry. The suspension may also be added in a processing step for the production of a wax or coating. Examples of waxes and coatings are cheese waxes, cheese coatings of the polyvinylacetate type, edible cheese coatings, oil-in-water or water-in-oil type of coatings, and casings for sausages. The suspension can also be applied by soaking of e.g. casings applied for sausages. In case of a processed animal feed, a composition according to the invention can be added in one of the processing steps of the production process.

In an embodiment of the invention a composition of the invention can be applied on food products and feed products, cosmetic products, pharmaceutical products and forestry products.

An aqueous solution of a polyanion, such as a lignin compound, is preferably prepared by dissolving the polyanion, such as a lignin compound, preferably lignosulfonate, in an aqueous solution, preferably water.

An aqueous solution of a polycation, preferably chitosan, is preferably prepared by solubilizing the polycation in an aqueous acidic solution comprising an acid such as, for example, lactate, hydrochloric acid, phosphorous acid and/or ascorbic acid. The amount of acid that is required to solubilize the polycation, preferably chitosan, depends on the polycation, as is known to the skilled person. For example, for solubilizing chitosan, in general, about 6 ml 37% HCl is required to obtain a solution of 10 gram chitosan in 1 liter in water. As an alternative, a polycation, preferably chitosan, is dissolved in an aqueous solution, preferably water, for example by gently shaking at 20-23° C. overnight, whereby a salt, preferably NaCl, is preferably added to the aqueous solution at a concentration between 1 mM and 1 M, preferably about 100 mM.

A polyanion solution, preferably a lignosulfonate, xanthan gum, humate, or alginate solution, is preferably added drop wise to the solution comprising a polycation, preferably a chitosan compound. If required, the pH is kept between pH 1 and pH 5.5 by the addition of an acid, preferably hydrochloric acid, lactic acid, ascorbic acid, phosphorous acid, nonanoic acid or acetic acid. The pH is more preferably kept between pH 2.0 and pH 5.0, more preferably between pH 3.0 and pH 4.5 during the formation of a polyelectrolyte complex. The temperature is preferably between 0° C. and 100° C., more preferred between 10° C. and 60° C., more preferred ambient temperature (15-25° C.). The resulting mixture is preferably stirred during formation of the polyelectrolyte complex and the polyelectrolyte complex is preferably allowed to settle overnight. Following settlement of the poly-electrolyte complex, a dispergent and/or a wetting agent is preferably added and the precipitate is crushed, preferably by milling for example in a bead mill, to provide a suspension comprising the polyelectrolyte complex of a polyanion and a polycation.

The relative amount of a polyanion and a polycation that are combined in step c) of a method according to the invention is between 1:2 and 60:1 (w/w), preferably between 2:1 and 30:1 (w/w), more preferred between about 5:1 and about 15:1 (w/w), even more preferred about 5:1. If required, an acid is added to the polycation-polyanion mixture to keep the pH of the mixture below pH=7, preferably below pH=5.5 in step c) of a method according to the invention. The final pH value of the resulting suspension comprising at least one antimicrobial compound may be adjusted to a pH value of between 3-12, more preferred between 4-9, most preferred between 5-8.

A suspension comprising a complex of at least one antimicrobial compound such as natamycin and a polyelectrolyte complex of a polyanion and a polycation may be diluted 2-1000 times, preferably about 200 times, with an edible solvent, preferably water, to contain between 0.0001 and 1% (w/v) of natamycin, prior to adding the suspension to a processed edible product.

A suspension comprising a complex of at least one antimicrobial compound and a polyelectrolyte complex of a polyanion and a polycation, may additionally comprise at least one compound selected from a sticking agent, a stabilizer, an antioxidant, a solubilizer, a chelating agent, a thickening agent, a dispersing agent, and a wetting agent.

Said sticking agent is preferably one or more compounds selected from long chain polysaccharides like gellan gum, guar gum, succinoglycan gum and xanthan gum; latex based products, and pinolene/terpene based products. Alternatively, the sticking agent may be a polymer or co-polymer from a polymer such as polyacrylate and polyethylene. A sticking agent is preferably present in an amount of between 0 to up to 20% (w/v), more preferred between 0.1 to up to 10% (w/v), more preferred between 1 to up to 5% (w/v), more preferred about 3% (w/v).

A stabilizer, when present, is preferably selected from xanthan gum, agar, succinoglycan gum (Rheozan), alginic acid, alginate, carrageenan; gellan gum, and guar gum. A composition of the invention may also comprise two or more different stabilizing agents. A stabilizer is preferably present in an amount of between 0 to up to 10% (w/v), more preferred between 0.01 to up to 5% (w/v), more preferred between 0.05 to up to 0.5% (w/v), more preferred about 0.05% (w/v).

A thickening agent, when present, is preferably one or more compounds selected from agar, alginic acid, carrageenan, gellan gum, xanthan gum, carrageenan gum, locust bean gum, polyvinyl acetate, alginate, succinoglycan gum, guar gum, acetylated distarch adipate, starch, acetylated oxidized starch, arabinogalactan, locust bean gum, starch sodium octenylsuccinate, and triethyl citrate and agents of cellulosic origin such as methylcellulose, ethyl cellulose, hydroxypropylmethylcellulose, hydroxypropylcellulose, and carboxymethylcellulose. Preferred thickening agents are gums, more preferably xanthan and/or gellan gum. A thickening agent is preferably present in an amount of between 0 to up to 10% (w/v), more preferred between 0.01 to up to 5% (w/v), more preferred between 0.02 to up to 1% (w/v), more preferred about 0.05% (w/v).

A solubilizer, when present, is preferably selected from surfactants of the anionic, cationic, non-ionic or amphoteric type. An example of an anionic surfactants is sodium lauryl sulfate. An example of a cationic surfactant is dodecyl ammonium chloride. Examples of hydrophilic nonionic surfactants are compounds known as Tween 20 and Tween 80. Examples of hydrophobic non-ionic surfactant are sorbitan monolaurate and sorbitan monostearate. Other known solubilizers are lecithin and polyvinylpyrrolidone. A solubilizer is preferably present in an amount of between 0 to up to 0.5% (w/v), more preferred between 0.01 to up to 0.1% (w/v), more preferred between 0.02 to up to 0.05% (w/v).

An example of a preferred chelating agent is EDTA (ethylene diamin tetra acidic acid). A chelating agent, preferably disodium or calcium disodium EDTA, is preferably present in an amount of between 0 to up to 1% (w/v), more preferred between 0.01 to up to 0.5% (w/v), more preferred between 0.02 to up to 0.1% (w/v).

Examples of preferred anti-oxidation agents are citric acid, ascorbic acid, vitamin A, vitamin E, carotenoid terpenoids such as alpha-carotene, lutein and zeaxanthin, flavonoids and riboflavin. An anti-oxidation agent is preferably present in an amount of between 0 to up to 1% (w/v), more preferred between 0.01 to up to 0.5% (w/v), more preferred between 0.02 to up to 0.1% (w/v).

A disperging agent, when present, is preferably one or more compounds selected from Morwet® D425, Tween 20, Tween 40, Tween 60, Tween 80, lignin sulphonate, an alkylpolysaccharide, an styrene acrylic polymer, an acrylic co-polymer, and ethoxylated tristyrenephenol phosphate, for example polyethoxylated fosforic acid. A disperging agent is preferably present in an amount of between 0 to up to 10% (w/v), more preferred between 0.01 to up to 5% (w/v), more preferred between 0.02 to up to 1% (w/v), more preferred about 0.05% (w/v).

A wetting agent, when present, is preferably one or more compounds selected from di-octylsuccinate, polyoxyethylene/polypropylene and tri-stearyl sulphonate/phosphate. A wetting agent is preferably present in an amount of between 0 to up to 10% (w/v), more preferred between 0.01 to up to 5% (w/v), more preferred between 0.02 to up to 1% (w/v), more preferred about 0.05% (w/v).

The suspension comprising a complex of at least one antimicrobial compound and a polyelectrolyte complex of a polyanion and a polycation, may additionally be added to a food or feed wax or foor or feed coating, Said wax, preferably a food wax, is preferably a natural or synthetic wax which is usually applied on for products such as cheese and is preferably selected from on or more waxes such as bees wax, carnauba wax, andelilla wax, ouricouri wax, sugarcane wax, retamo wax, Chinese wax, jojoba oil, paraffin wax, esparto wax, Montan wax, candelilla wax, whale spermaceti, lanolin, and ethylene glycol diesters or triesters of long-chain fatty acids (C18-C36). A wax is preferably present in an amount of between 0 to up to 10% (w/v), more preferred between 0.01 to up to 5% (w/v), more preferred between 0.05 to up to 0.5% (w/v), more preferred about 0.1% (w/v).

Said coating, preferably food coating, may be any coating applied on food products. Preferably the suspension is incorporated in a coating which is applied on dairy or meat products. Food coatings are usually applied by using a coating solution in liquid form on a food product such as cheese. The coating solidifies upon drying of the coating solution. A food coating can be derived from biodegradable, natural or synthetic substances. Mostly synthetic substances comprising a polymer are used. Such coatings are commonly formed by applying a polymer latex dispersion onto the food product, which upon drying, forms the coating. Food coatings such as cheese coatings are mostly an emulsion of a polymer in water. Examples of polymer in water coatings are coatings derived from one of more of the following groups: vinylacetate, ethylene, vinyl-ester saturated fatty acids, maleic acid, fumaric acid and acrylic acid. Preferably the polymer in water coating comprises a polymer made from vinylacetate, maleic acid and/or fumaric acid. Most preferably the coating is polyvinyl acetate which can be applied as a coating on e.g. cheese. Other examples of food coatings are oil-in-water or water-in-oil emulsions or natural (edible) coatings derived from, polysaccharides, cellulose, chitosan, starch, lipids, proteins and/or plant extracts.

It will be clear to the skilled person that a processed edible product according to the invention, comprising a complex of at least one antimicrobial compound and a polyelectrolyte complex of a polyanion and a polycation, will additionally comprise optionally at least one compound selected from a sticking agent, a stabilizer, an antioxidant, an anti-foam-forming agent, a spray oil, an UV-protectant, an anti-freezing agent, a solubilizer, a chelating agent, and a flow additive, a thickening agent, a dispersing agent, and a wetting agent, if said at least one compound was included in the suspension comprising a complex of at least one antimicrobial compound and a polyelectrolyte complex of a polyanion and a polycation, that was added to the processed edible product.

Examples

Example 1. Preparation of CitoCal 10 gram of Chitosan was suspended in 885 mL water, 5 gram 37% HCl was added to completely dissolve the chitosan. Then 100 gram Calcium-Lignosulfonate was added portion wise to the solution. A milky solution appeared immediately and solids precipitated from the solution. When 40-50 grams of the Ca-LS was added a rise in viscosity was observed and the aqueous solution thickened and the polyelectrolyte clearly separated as a solid from the aqueous phase. By addition of the remaining 50 gr Ca-LS the aqueous phase became less viscous. The solid was settled overnight.

Example 2: Efficacy on Cheese

This example illustrates the improved efficacy of natamycin when applied using a composition of the present invention towards *Penicillium* discolor on cheese.

Pieces of cheese of 5×5×5 cm are cut from a freshly brined wheel of Gouda cheese. The pieces are dipped into a bath of melted paraffin at 80° C. in such a manner that the original surface area remains free of paraffin.

Spores of *Penicillium* discolor are prepared using well known methods and use to inoculate on the surface of the cheese ($10^3$ spores/cm$^2$) using well known methods. The pieces of cheese are stored overnight in closed plastic boxes at 4° C.

On each piece of cheese, a composition according to the invention (see table 1 and table 2) is applied using well known methods (n=5). The pieces of cheese are incubated at room temperature in closed plastic boxes. Every clay, the number of visible colonies on each piece of cheese is counted for a total period of two weeks.

The results show that the compositions of the present invention protect the pieces of cheese better against fungal growth compared to the activity of the active compound natamycin when applied individually.

TABLE 1

Formulations

| | #1 Adjuvants | #2 Adjuvants + citocal | #3 Adjuvants + CitocalHumic | #4 Adjuvants + CitocalMorwet | #5 Adjuvants + oligo-Citocal | #6 Adjuvants + ai |
|---|---|---|---|---|---|---|
| Water | 664 | 664 | 664 | 664 | 664 | 664 |
| Ca-Lignosulfonate | | 250 | | | 250 | |
| Potassium humate | | | 100 | | | |
| Morwet (Akzo) | | | | 83.3 | | |
| Chitosan | | 10 | 10 | 10 | | |
| Oligomers of Chitosan | | | | | 10 | |
| H3PO3 | | 5 | 5 | 5 | 5 | |
| Sodiumdioctylsuccinate (50%) | 40 | 40 | 40 | 40 | 40 | 40 |
| Sophorolipid | 75 | 75 | 75 | 75 | 75 | 75 |
| Xanthan gum (2% in H2O) | 55 | 55 | 55 | 55 | 55 | 55 |
| polydimethylsiloxane | 1 | 1 | 1 | 1 | 1 | 1 |
| Natamycin | | | | | | 10 |

TABLE 1-continued

Formulations

| | Treatment: | | | |
|---|---|---|---|---|
| | #7 Adjuvants + citocal + ai | #8 Adjuvants + CitocalHumic + ai | #9 Adjuvants + CitocalMorwet + ai | #10 Adjuvants + oligo-Citocal + ai |
| Water | 664 | 664 | 664 | 664 |
| Ca-Lignosulfonate | 250 | | | 250 |
| Potassium humate | | 100 | | |
| Morwet (Akzo) | | | 83.3 | |
| Chitosan | 10 | 10 | 10 | |
| Oligomers of Chitosan | | | | 10 |
| H3PO3 | 5 | 5 | 5 | 5 |
| Sodiumdioctylsuccinate (50%) | 40 | 40 | 40 | 40 |
| Sophorolipid | 75 | 75 | 75 | 75 |
| Xanthan gum (2% in H2O) | 55 | 55 | 55 | 55 |
| polydimethylsiloxane | 1 | 1 | 1 | 1 |
| Natamycin | 10 | 10 | 10 | 10 |

All amounts are in grams.
ai = active ingredient.

TABLE 2

Formulation

| | Formulation g/l | | | | | |
|---|---|---|---|---|---|---|
| | N1 Adjuvants | N2 Adjuvants + CitoCal | N3 Adjuvants + Lysocal | N4 Adjuvants + AllyloCal | N6 Adjuvants + CHS:LS 2:1 | N7 Adjuvants + CHS:LS 1:2 |
| Water | 751.0 | 751.0 | 751.0 | 751.0 | 751.0 | 751.0 |
| Ca-LS | | 50.0 | 50.0 | 50.0 | 5.0 | 20.0 |
| Chitosan | | 10.0 | | | 10.0 | 10.0 |
| Poly-e-Lysine | | | 10.0 | | | |
| Poly-allylamine HCl | | | | 10.0 | | |
| H3PO3 | | 5.0 | 5.0 | | 5.0 | 5.0 |
| Sodiumdioctyl-succinate (50%) | 40.0 | 40.0 | 40.0 | 40.0 | 40.0 | 40.0 |
| Sophorolipid | 75.0 | 75.0 | 75.0 | 75.0 | 75.0 | 75.0 |
| Xanthan (2% in water) | 55.0 | 55.0 | 55.0 | 55.0 | 55.0 | 55.0 |
| Polydimethylsiloxane | 4.0 | 4.0 | 4.0 | 4.0 | 4.0 | 4.0 |
| Natamycine | | | | | | |
| Totals | 925.0 | 990.0 | 990.0 | 985.0 | 945.0 | 960.0 |

| | Formulation g/l | | | | | |
|---|---|---|---|---|---|---|
| | N8 Adjuvants + ai | N9 Adjuvants + CitoCal + ai | N10 Adjuvants + LysoCal + ai | N11 Adjuvants + AllyloCal + ai | N13 Adjuvants + CHS:LS 2:1 + ai | N14 Adjuvants + CHS:LS 1:2 + ai |
| Water | 771.0 | 751.0 | 751.0 | 751.0 | 751.0 | 751.0 |
| Ca-LS | | 50.0 | 50.0 | 50.0 | 5.0 | 20.0 |
| Chitosan | | 10.0 | | | 10.0 | 10.0 |
| Poly-e-Lysine | | | 10.0 | | | |
| Poly-allylamine HCl | | | | 10.0 | | |
| H3PO3 | | 5.0 | 5.0 | | 5.0 | 5.0 |
| Sodiumdioctyl-succinate (50%) | 40.0 | 40.0 | 40.0 | 40.0 | 40.0 | 40.0 |
| Sophorolipid | 75.0 | 75.0 | 75.0 | 75.0 | 75.0 | 75.0 |
| Xanthan (2% in water) | 55.0 | 55.0 | 55.0 | 55.0 | 55.0 | 55.0 |
| Polydimethylsiloxane | 4.0 | 4.0 | 4.0 | 4.0 | 4.0 | 4.0 |
| Natamycine | 10.0 | 10.0 | 10.0 | 10.0 | 10.0 | 10.0 |
| Totals | 955.0 | 1000.0 | 1000.0 | 995.0 | 955.0 | 970.0 |

All amounts are in grams.
ai = active ingredient.

Example 3

This example illustrates the improved efficacy towards moulds on sausages of natamycin compositions prepared according to the invention comprising natamycin and a polyelectrolyte complex.

Formulations described in Tables 3-5 were prepared as described in Example 1 for CitoCal.

Dutch sausages (Cervelaatworst; 500 grams, Aro Products N.V., Zenist, Belgium) were obtained and cut into pieces of 1.5 cm thickness. The surface of the pieces was 12 cm$^2$. The pieces of salami were immersed in a bath containing the compositions described in Tables 3-5 for 5 seconds, dripped, dried and stored overnight at 4° C. in closed plastic boxes. For each treatment 6 pieces of salami were taken.

The other day, each piece of salami was inoculated with 2.5×104 spores of a freshly prepared spore suspension of *Penicillium* discolor DTO 74H1 (obtained from the Centraal Bureau voor Schimmelcultures, Utrecht, The Netherlands) produced using well known methods. The inoculation was performed by applying 0.1 ml of a spore suspension containing 2.5×10$^5$ spores per ml to the surface of each piece of sausage. The spores were evenly spread over the surface of the salami using a sterile swab which was saturated with the spore suspension. The pieces of salami were incubated in closed plastic boxes at 21° C. in the dark.

After 7 days of incubation the pieces of sausage were judged and scored on moulding on the surface: no moulds, countable colonies in CFU (CFU=Colony Forming Unit), fully moulded. The results are presented in Table 3-5.

TABLE 3

Results pieces of sausage treated with AllyloHum polyelectrolyte composition after 7 days of incubation (n = 6).

| Compositions | Number of fully moulded containers | Number of containers with countable colonies | Number of containers with no moulds |
|---|---|---|---|
| Untreated | 6 | | |
| Adjuvants | 6 | | |
| Adjuvants + AllyloHum | 5 | 1$_{(20\ CFU)}$ | |
| Adjuvants + Natamycin (1000 ppm) | 4 | 1$_{(22\ CFU)}$ | 1 |
| Adjuvants + AllyloHum + Natamycin (1000 ppm) | | | 6 |

TABLE 4

Results pieces of sausage treated with AllyloCal polyelectrolyte composition after 7 days of incubation (n = 6).

| Compositions | Number of fully moulded containers | Number of containers with countable colonies | Number of containers with no moulds |
|---|---|---|---|
| Untreated | 6 | | |
| Adjuvants | 6 | | |
| Adjuvants + AllyloCal | 6 | | |
| Adjuvants + Natamycin (1000 ppm) | 4 | 1$_{(22\ CFU)}$ | 1 |
| Adjuvants + AllyloCall + Natamycin (1000 ppm) | 2 | 1$_{(12\ CFU)}$ | 3 |

TABLE 5

Results pieces of sausage treated with CitoCal polyelectrolyte composition after 7 days of incubation (n = 6).

| Compositions | Number of fully moulded containers | Number of containers with countable colonies | Number of containers with no moulds |
|---|---|---|---|
| Untreated | 6 | | |
| Adjuvants | 6 | | |
| Adjuvants + CitoCal | 5 | 1$_{(10\ CFU)}$ | |
| Adjuvants + Natamycin (1000 ppm) | 4 | 1$_{(22\ CFU)}$ | 1 |
| Adjuvants + CitoCal + Natamycin (1000 ppm) | 0 | 2$_{(4,\ 16\ CFU)}$ | 4 |

Example 4

This example illustrates the improved efficacy towards moulds on cheese of natamycin compositions prepared according to the invention comprising natamycin and a polyelectrolyte complex. Gouda blocks of cheese ripened for approximately 4 weeks and not containing any antifungal compounds such as natamycin or sorbate was obtained from a local retailer. The cheese was cut in pieces of 5×5×3 cm and placed in plastic boxes. The surface of the pieces was 25 cm2.

Each piece of cheese was inoculated with 2×10$^3$ spores of a freshly prepared spore suspension of *Penicillium* discolor DTO 74H1 (obtained from the Centraal Bureau voor Schimmelcultures, Utrecht, The Netherlands) produced using well known methods. The inoculation was performed by applying 0.2 ml of a spore suspension containing 10$^4$ spores per ml to the surface of each piece of cheese. The spores were evenly spread over the surface of the cheese using a sterile swab which was saturated with the spore suspension after which the pieces were incubated for 2 hours at room temperature.

After 2 hours of incubation the pieces of cheese were sprayed with the different compositions up to the point of saturation after which the pieces of cheese were chipped and incubated overnight at 21° C. in closed plastic boxes in the dark. For each treatment 6 pieces of cheese were taken.

After 4 days of incubation the pieces of cheese were judged and scored on moulding on the surface: no moulds, countable colonies in CFU (CFU=Colony Forming Unit), fully moulded. The results are presented in Table 6-8.

TABLE 6

Results pieces of cheese treated with AllyloHum polyelectrolyte composition after 4 days of incubation (n = 6).

| Composition | Number of fully moulded containers | Number of containers with countable colonies | Number of containers with no moulds |
|---|---|---|---|
| Untreated | 6 | | |
| Adjuvants | 6 | | |
| Adjuvants + AllyloHum | 6 | | |
| Adjuvants + Natamycin (1000 ppm) | 4 | 2$_{(18,\ 3\ CFU)}$ | |
| Adjuvants + AllyloHum + Natamycin (1000 ppm) | | 5$_{(49,\ 9,\ 9,\ 1,\ 1\ CFU)}$ | 1 |

TABLE 7

Results pieces of cheese treated with AllyloCal polyelectrolyte composition after 4 days of incubation (n = 6).

| Composition | Number of fully moulded containers | Number of containers with countable colonies | Number of containers with no moulds |
|---|---|---|---|
| Untreated | 6 | | |
| Adjuvants | 6 | | |
| Adjuvants + AllyloCal | 6 | | |
| Adjuvants + Natamycin (1000 ppm) | 4 | 2$_{(18, 3\ CFU)}$ | |
| Adjuvants + AllyloCal + Natamycin (1000 ppm) | | 5$_{(20, 16, 5, 4, 4\ CFU)}$ | 1 |

TABLE 8

Results pieces of cheese treated with CitoCal polyelectrolyte composition after 4 days of incubation (n = 6).

| Composition | Number of fully moulded containers | Number of containers with countable colonies | Number of containers with no moulds |
|---|---|---|---|
| Untreated | 6 | | |
| Adjuvants | 6 | | |
| Adjuvants + CitoCal | 6 | | |
| Adjuvants + Natamycin (2000 ppm) | 2 | 4$_{(6, 6, 5, 4\ CFU)}$ | |
| Adjuvants + CitoCal + Natamycin (2000 ppm) | | 4$_{(14, 13, 3, 1\ CFU)}$ | 2 |

Even after 6 days of incubation the compositions of the invention performed much better: all control pieces were fully moulded, while on 4 pieces treated with the composition of the invention (2000 ppm of natamycin) countable colonies were visible (see Table 9).

TABLE 9

Results pieces of cheese treated with polyelectrolyte compositions after 6 days of incubation (n = 6).

| Compositions | Number of fully moulded containers | Number of containers with countable colonies |
|---|---|---|
| Untreated | 6 | |
| Adjuvants | 6 | |
| Adjuvants + AllyloHum | 6 | |
| Adjuvants + AllyloCal | 6 | |
| Adjuvants + CitoCal | 6 | |
| Adjuvants + Natamycin (2000 ppm) | 6 | |
| Adjuvants + AllyloHum + Natamycin (2000 ppm) | 2 | 4$_{(<75(3x), 23\ CFU)}$ |
| Adjuvants + AllyloCal + Natamycin (2000 ppm) | 2 | 4$_{(<75(3x), 26\ CFU)}$ |
| Adjuvants + CitoCal + Natamycin 2000 ppm | 2 | 4$_{(<75(2x), 43, 32\ CFU)}$ |

These results clearly demonstrate that natamycin compositions according to this invention demonstrate superiority over the other tested compositions.

Example 5. Polyelectrolyte Formulations on Applesauce

This example illustrates the improved efficacy towards moulds in applesauce of natamycin compositions prepared according to the invention comprising natamycin and polyelectrolyte complexes as described in Example 1.

Fresh applesauce was prepared from Jonagold apples using well-known methods; 25 gram of applesauce was added to round plastic containers with a diameter of 6 cm and a depth of 1 cm. The different compositions were mixed through the apple sauce to a final concentration of 10 ppm of natamycin. To allow an optimal diffusion of the active through the applesauce, the containers were pre-incubated overnight at 4° C.

The other clay each container with applesauce was inoculated with 3×10$^4$ spores per container of a freshly prepared spore suspension of *Penicillium expansum* DTO 227-13, isolated from apple jelly (obtained from the Centraal Bureau voor Schimmelcultures, Utrecht, The Netherlands). The spore suspension was produced using well known methods.

The inoculation was performed by applying 0.5 ml of a spore suspension containing the required amount of spores on the surface of each container with applesauce. The spores were evenly divided over the surface of the applesauce by taking care that the whole surface was equally treated with the 0.5 ml of spore suspension. The containers with applesauce were placed in closed plastic boxes and incubated at 21° C. in the dark. For each treatment 6 containers of applesauce were taken. The results are presented in Table 10.

TABLE 10

Results containers with applesauce treated with the polyelectrolyte compositions after 2 and 6 days of incubation (n = 6)

| Compositions | Number of containers that were moulded after 2 days of incubation* | Number of containers that were moulded after 6 days of incubation** |
|---|---|---|
| Untreated | 6 | 6 |
| Adjuvants | 6 | 6 |
| Adjuvants + AllyloHum | 6 | 6 |
| Adjuvants + AllyloCal | 6 | 6 |
| Adjuvants + CitoCal | 6 | 6 |
| Adjuvants + Natamycin (10 ppm) | | 4 |
| Adjuvants + AllyloHum + Natamycin (10 ppm) | | |
| Adjuvants + AllyloCal + Natamycin (10 ppm) | | 1 |
| Adjuvants + CitoCal + Natamycin (10 ppm) | | 1 |

*After 2 days of incubation all negative controls not containing natamycin were fully moulded.
**After 6 days of incubation the containers with applesauce containing natamycin showed 0 (Adjuvants + AllyloHum + Natamycin) or 1-3 countable colonies per container.

These results clearly demonstrate that natamycin compositions according to this invention demonstrate superiority over the other tested compositions.

The invention claimed is:

1. A composition comprising at least one antimicrobial compound and a solid, insoluble polyelectrolyte complex of a polyanion and poly-allylamine as a polycation, wherein said polyanion and said polycation are present in relative amounts of from 1:2 to 60:1 (w/w).

2. The composition of claim 1, wherein said polyanion is selected from the group consisting of chondroitine sulphate, humate, and lignosulfonate.

3. The composition of claim 1, wherein said polyanion and polycation are present in relative amounts of about 5:1 to 10:1 (w/w).

4. The composition of claim 1, wherein the antimicrobial compound is an antifungal compound.

5. The composition of claim 1, wherein the antimicrobial compound is a polyene fungicide.

6. The composition of claim 1, wherein the composition is a suspension.

7. A method comprising applying the composition of claim 1 on a food, feed, cosmetic, pharmaceutical or forestry product.

8. The composition of claim 1, wherein said polyanion and polycation are present in relative amounts of about 1:1 to 15:1 (w/w).

* * * * *